(12) United States Patent
Minemi et al.

(10) Patent No.: US 6,910,333 B2
(45) Date of Patent: Jun. 28, 2005

(54) RANKINE CYCLE DEVICE OF INTERNAL COMBUSTION ENGINE

(75) Inventors: Masahiko Minemi, Wako (JP); Hiroyuki Miura, Wako (JP); Kazuo Yoshida, Wako (JP); Masakatsu Miyao, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/398,167

(22) PCT Filed: Oct. 5, 2001

(86) PCT No.: PCT/JP01/08825

§ 371 (c)(1),
(2), (4) Date: Oct. 29, 2003

(87) PCT Pub. No.: WO02/31320

PCT Pub. Date: Apr. 18, 2002

(65) Prior Publication Data
US 2004/0060292 A1 Apr. 1, 2004

(30) Foreign Application Priority Data
Oct. 11, 2000 (JP) .................................... 2000-316832

(51) Int. Cl.$^7$ .............................................. F01K 23/10
(52) U.S. Cl. .............................. 60/618; 60/616; 60/614
(58) Field of Search .......................... 60/614, 615, 616, 60/617, 618

(56) References Cited

U.S. PATENT DOCUMENTS

| | | | | |
|---|---|---|---|---|
| 4,586,338 A | | 5/1986 | Barrett et al. | |
| 5,339,632 A | * | 8/1994 | McCrabb et al. | 60/618 |
| 5,351,487 A | * | 10/1994 | Abdelmalek | 60/618 |
| 5,806,332 A | * | 9/1998 | Shea, Sr. | 62/323.3 |
| 6,301,890 B1 | * | 10/2001 | Zeretzke | 60/616 |
| 2003/0005696 A1 | * | 1/2003 | Wilson | 60/618 |

FOREIGN PATENT DOCUMENTS

| | | |
|---|---|---|
| JP | 57-26363 A | 2/1982 |
| JP | 60-93110 A | 5/1985 |
| JP | 8-68318 A | 3/1996 |
| JP | 8-144850 A | 6/1996 |

* cited by examiner

Primary Examiner—Hoang Nguyen
(74) Attorney, Agent, or Firm—Birch, Stewart, Kolasch & Birch, LLP

(57) ABSTRACT

A Rankine cycle system includes a first Rankine cycle (2A) operated by a first working medium and a second Rankine cycle (2B) operated by a second working medium. The first Rankine cycle (2A) is constituted from an evaporator (3A), an expander (4), a condenser (5A) and a supply pump (6A), and the second Rankine cycle (2B) is constituted from an evaporator (3B), the expander (4), a condenser (5B) and a supply pump (6c). The evaporator (3A) in the first Rankine cycle (2A) and the evaporator (3B) in the second Rankine cycle (2B) are disposed at locations upstream and downstream of an exhaust emission control device (8) mounted in an exhaust passage (7) for the internal combustion engine (1). The first working medium has a boiling point higher than that of the second working medium, and the capacity of the pump (6A) in at least the first Rankine cycle (2A) is variable. Thus, the efficiency of recovery of a waste heat from the internal combustion engine by the Rankine cycle system can be enhanced to the maximum, and the activation of the exhaust emission control device can be promoted.

2 Claims, 12 Drawing Sheets

RANKINE CYCLE DEVICE OF INTERNAL COMBUSTION ENGINE

This application is the national phase under 35 U.S.C. § 371 of PCT International Application No. PCT/JP01/08825 which has an International filing date of Oct. 5, 2001, which designated the United States of America.

FIELD OF THE INVENTION

The present invention relates to a Rankine cycle system for an internal combustion engine, including a first Rankine cycle operated by a first working medium and a second Rankine cycle operated by a second working medium.

BACKGROUND ART

There are waste-heat recovery systems known from Japanese Patent Application Laid-open Nos.60-93110 and 8-68318, each of which includes heat exchangers mounted at locations upstream and downstream of an exhaust emission control device mounted in an exhaust passage for an internal combustion engine, so that water as a working medium is supplied to the heat exchangers where it is subjected to a heat exchange with an exhaust gas. There are also Rankine cycle systems known from Japanese Patent No.2650660, each of which including an evaporator, an expander, a condenser and a supply pump, wherein a mixture of a medium having a higher boiling point and a medium having a lower boiling point is used as a working medium.

In an internal combustion engine including an exhaust emission control device mounted in an exhaust passage, a catalyst in the exhaust emission control device is not activated in a lower-temperature state immediately after the start of the internal combustion engine and hence, the exhaust emission control performance is temporarily degraded. For this reason, it is required that the catalyst is heated and activated promptly by heat of an exhaust gas. However, if an evaporator in a Rankine cycle system is disposed at a location upstream of the exhaust emission control device, the following problem is encountered: the exhaust gas is robbed of its heat by the evaporator and hence, the activation of the catalyst is retarded. If an evaporator is also disposed at a location downstream of the exhaust emission control device in addition to the location upstream of the exhaust emission control device, then the exhaust gas is robbed of its heat immediately after the start of the internal combustion engine by the upstream evaporator and the exhaust emission control device. For this reason, the downstream evaporator cannot generate a sufficient amount of vapor and thus, it is difficult to effectively operate the Rankine cycle system.

DISCLOSURE OF THE INVENTION

The present invention has been accomplished with the above-described circumstances in view, and it is an object of the present invention to ensure that the efficiency of recovery of a waste heat from an internal combustion engine by a Rankine cycle system is increased to the maximum, and the activation of a catalyst in an exhaust emission control device is promoted.

To achieve the above object, according to a first aspect and feature of the present invention, there is proposed a Rankine cycle system for an internal combustion engine, comprising a first Rankine cycle operated by a first working medium and a second Rankine cycle operated by a second working medium, each of the Rankine cycles being comprised of an vaporator for heating a liquid-phase working medium by waste heat from the internal combustion engine to generate a vapor, an expander for converting the heat energy of the vapor discharged by the evaporator into a mechanical energy, a condenser for cooling the vapor discharged by the expander to return the vapor into the liquid-phase working medium, and a supply pump for supplying the liquid-phase working medium discharged by the condenser to the evaporator, wherein the evaporator in the first Rankine cycle and the evaporator in the second Rankine cycle are disposed at locations upstream and downstream of an exhaust emission control device mounted in an exhaust passage for the internal combustion engine; the first working medium is of a boiling point higher than that of the second working medium; and the capacity of the supply pump in at least the first Rankine cycle is variable.

With the above arrangement, if the amount of first working medium supplied to the evaporator in the first Rankine cycle mounted at the location upstream of the exhaust emission control device is decreased, or such supplying of the first working medium is stopped immediately after the start of the internal combustion engine or during a lower-load operation of the internal combustion engine, the heat energy of an exhaust gas can be applied effectively to the exhaust emission control device to activate a catalyst in the exhaust emission control device, thereby enhancing the exhaust gas purifying effect. Moreover, the second working medium flowing through the evaporator in the second Rankine cycle mounted at the location downstream of the exhaust emission control device is of the lower boiling point and hence, can be converted easily into the vapor by the lower-temperature exhaust gas immediately after the start of the internal combustion engine or during the lower-load operation of the internal combustion engine to operate the expander without hindrance.

If the working media are supplied to the evaporator in the first Rankine cycle mounted at the location upstream of the exhaust emission control device and evaporator in the second Rankine cycle mounted at the location downstream of the exhaust emission control device, respectively, during a higher-load operation of the internal combustion engine after completion of the warming of the engine, the heat energy of the exhaust gas can be recovered to the maximum to increase the output from the expander. Moreover, the first working medium flowing in the expander on an upstream side where the temperature of the exhaust gas is higher is of the higher boiling point, and the second working medium flowing in the expander on a downstream side where the temperature of the exhaust gas is lower is of the lower boiling point and hence, the heat energy of the exhaust gas can be recovered further effectively.

According to a second aspect and feature of the present invention, in addition to the first feature, the expander includes higher-pressure expanding portions and lower-pressure expanding portions, so that outputs from both of the expanding portions can be united together and output from a common rotary shaft; the vapor of the first working medium is supplied to the higher-pressure expanding portions; and the vapor of the second working medium is supplied to the lower-pressure expanding portions.

With the above arrangement, the expander includes the higher-pressure expanding portions to which the vapor of the first working medium is supplied, and the lower-pressure expanding portions to which the vapor of the second working medium is supplied, so that the outputs from both of the expanding portions are united together and output from the rotary shaft. Therefore, a special output-uniting means is not required to be mounted, leading to a simplified structure.

Cylinders 33 and vane chambers 50 in an embodiment correspond to the higher-pressure and lower-pressure expanding chambers of the present invention, respectively.

BRIEF DESCRIPTION OF THE DRAWINGS

FIG. 1 is a schematic diagram of a Rankine cycle system for an internal combustion engine;

FIG. 2 is a vertical sectional view of an expander, corresponding to a sectional view taken along a line 2—2 in FIG. 4;

FIG. 3 is an enlarged sectional view of an area around a rotational axis in FIG. 2;

FIG. 4 is a sectional view taken along a line 4—4 in FIG. 2;

FIG. 5 is a sectional view taken along a line 5—5 in FIG. 2;

FIG. 6 is an enlarged view of a portion of FIG. 4;

FIG. 7 is an enlarged sectional view taken along a line 7—7 in FIG. 3;

FIG. 8 is a diagram showing sectional shapes of a rotor chamber and a rotor;

FIG. 9 is an exploded perspective view of the rotor;

FIG. 10 is an exploded perspective view of a rotor segment;

FIG. 11 is an exploded perspective view of a vane; and

FIG. 12 is an exploded perspective view of a rotary valve.

BEST MODE FOR CARRYING OUT THE INVENTION

An embodiment of the present invention will now be described with reference to FIGS. 1 to 12.

Figure 1:
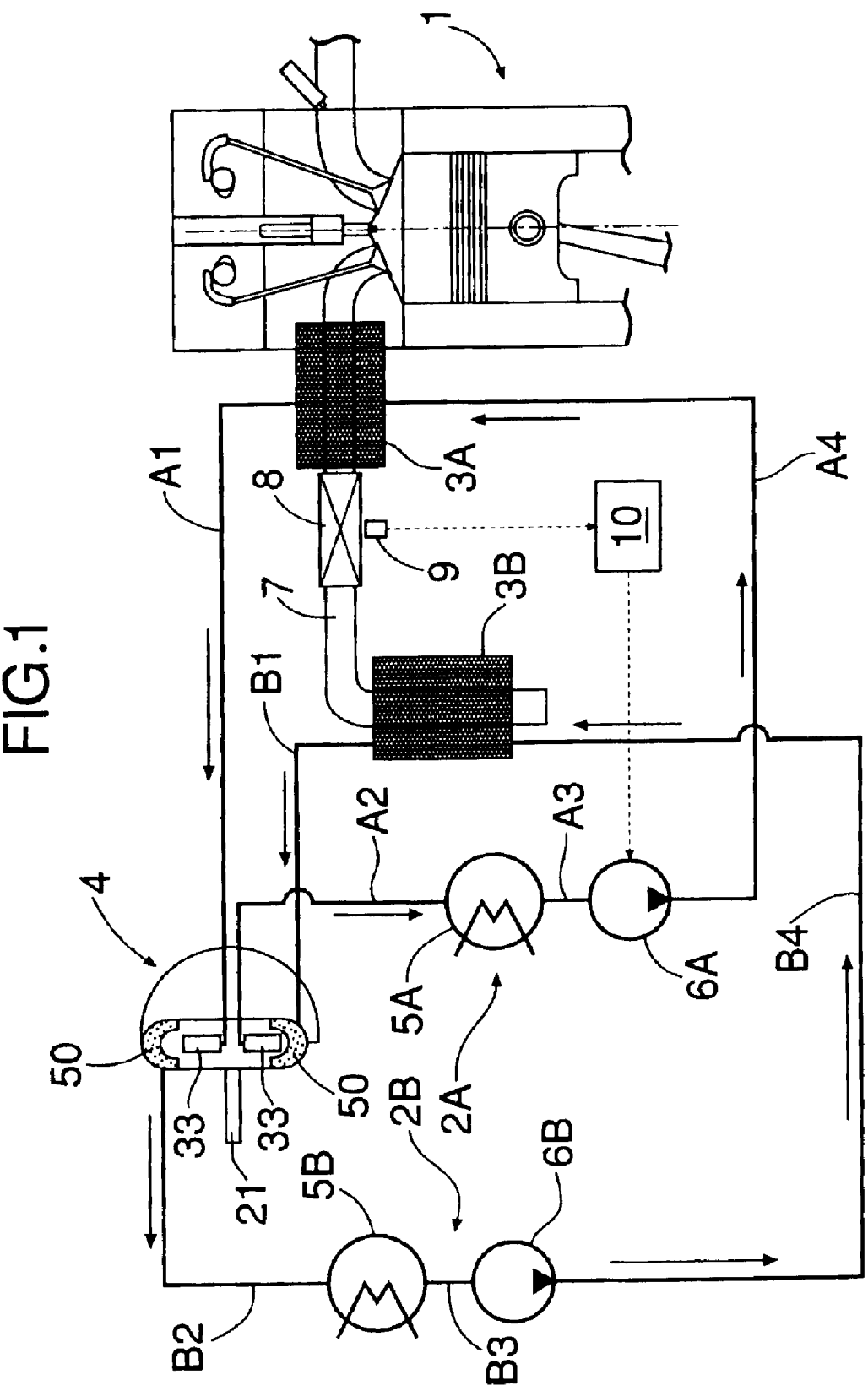
FIGS. 1 to 12 show an embodiment of the present invention.

Referring to FIG. 1, a Rankine cycle system using an exhaust gas from an internal combustion engine 1 as a heat source is comprised of a first Rankine cycle 2A and a second Rankine cycle 2B using working media independent from each other. An exhaust emission control device 8 of a ternary catalyst type is mounted in an exhaust passage 7 for the internal combustion engine 1; and a first evaporator 3A is mounted at a location upstream of the exhaust emission control device 8, and a second evaporator 3B is mounted at a location downstream of the exhaust emission control device 8.

The first Rankine cycle 2A includes the first evaporator 3A for gasifying a first working medium having a high boiling point (water in the embodiment) by heat of the exhaust gas to generate vapor in a high-temperature and a high-pressure state, an expander 4 for generating an output by th expansion of the vapor, a first condenser 5A for liquefying the vapor having a temperature and a pressure dropped by converting a pressure energy into a mechanical energy in the expander 4, and a first supply pump 6A for supplying the water from the first condenser 5A in a pressurized state again to the first evaporator 3A. The evaporator 3A, the expander 4, the condenser 5A and the supply pump 6A in the first Rankine cycle 2A are connected to one another by passages A1 to A4 to constitute a closed loop.

The second Rankine cycle 2B includes the second evaporator 3B for gasifying a second working medium having a low boiling point (pentene or substitution flon in the embodiment) by heat of the exhaust gas to generate vapor in a high-temperature and a high-pressure state, the expander 4 for generating an output by the expansion of the vapor, a second condenser 5B for liquefying the vapor having a temperature and a pressure dropped by converting the pressure energy into the mechanical energy in the expander 4, and a second supply pump 6B for supplying the water from the second condenser 5B in a pressurized state again to the second evaporator 3B. The evaporator 3B, the expander 4, the condenser 5B and the supply pump 6B in the second Rankine cycle 2B are connected to one another by passages B1 to B4 to constitute a closed loop.

The expander 4 is used commonly in the first Rankine cycle 2A and the second Rankine cycle 2B, but the first working medium and the second working medium cannot be mixed together in the expander 4. More specifically, the first working medium in the first Rankine cycle 2A generates a shaft torque in each of cylinders 33 which are high-pressure expanding portions of the expander 4, and the second working medium in the second Rankine cycle 2B generates a shaft torque in each of vane chambers 50 which are low-pressure expanding portions of the expander 4. Both of the shaft torques are united with each other in the expander 4 and output from a common rotary shaft 21.

The flow rate of the working medium in the first Rankine cycle 2A, namely, the capacity of the first supply pump 6A is controlled by an electronic control unit 10, based on a temperature of a catalyst in the exhaust emission control device 8 detected by a temperature sensor 9.

The entire structure of the expander 4 will be described below with reference to FIGS. 2 to 6.

The expander 4 has a casing 11, which is comprised of first and second casing halves 12 and 13 made of a metal. The first and second casing halves 12 and 13 comprise bodies 12a, 13a defining a rotor chamber 14 by cooperation with each other, and circular flanges 12b, 13b integrally connected to outer peripheries of the bodies 12a, 13a, respectively. The circular flanges 12b and 13b are coupled to each other through a metal gasket 15. An outer surface of the first casing half 12 is covered with an intake chamber outer-wall 16 having a deep bowl-shape, and a circular flange 16a integrally connected to an outer periphery of the outer wall 16 is superposed on a left side of the circular flange 12b of the first casing half 12. An outer surface of the second casing half 13 is covered with an exhaust chamber outer-wall 17 in which a magnet coupling (not shown) for transmitting the output from the expander 4 to the outside is accommodated, and a circular flange 17a integrally connected to an outer periphery of the outer wall 17 is superposed on a right side of the circular flange 13b of the second casing half 13. The four circular flanges 12a, 13a, 16a and 17a are fastened commonly by a plurality of bolts disposed circumferentially. An intake chamber 19 is defined between the intake chamber outer-wall 16 and the first casing half 12, and an exhaust chamber 20 is defined between the exhaust chamber outer-wall 17 and the second casing half 13. A discharge bore 17b for guiding the dropped-temperature and dropped-pressure vapor finishing its work in the expander 4 to the second condenser 5B is provided in the exhaust chamber outer-wall 17.

Each of the bodies 12a and 13a of the casing halves 12 and 13 has a hollow bearing tube 12c, 13c protruding outwards, and a rotary shaft 21 having a hollow 21a is rotatably supported in the hollow bearing tubes 12c and 13c with a pair of bearing members 22 and 23 interposed therebetween. Thus, an axis L of the rotary shaft 21 extends through an intersection between a longer diameter and a shorter diameter in a rotor chamber 14. A smaller-diameter portion 21b at a right end of the rotary shaft 21 extends through the hollow bearing tube 13c of the second casing half 13 into the exhaust chamber 20, and a rotor boss 24 of the magnet coupling is spline-coupled to the smaller-diameter portion 21b. An outer periphery of the smaller-diameter portion 21b at the right end of the rotary shaft 21 and an inner periphery of the hollow bearing tube 13c of the second casing half 13 are sealed from each other by a seal member 25, which is fixed by a nut 26 threadedly fitted to the inner periphery of the hollow bearing tube 13c.

Figure 4:
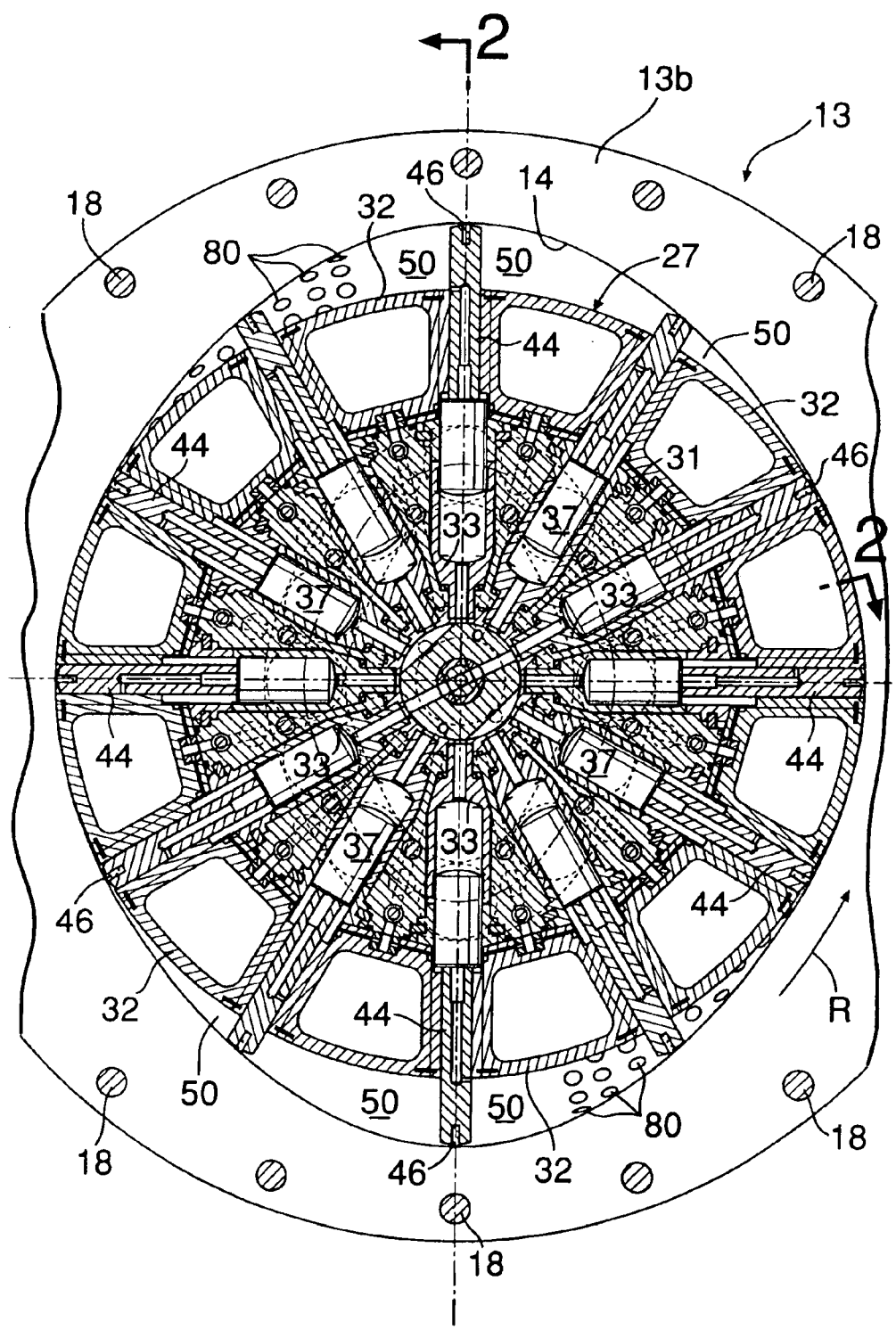
Figure 8:
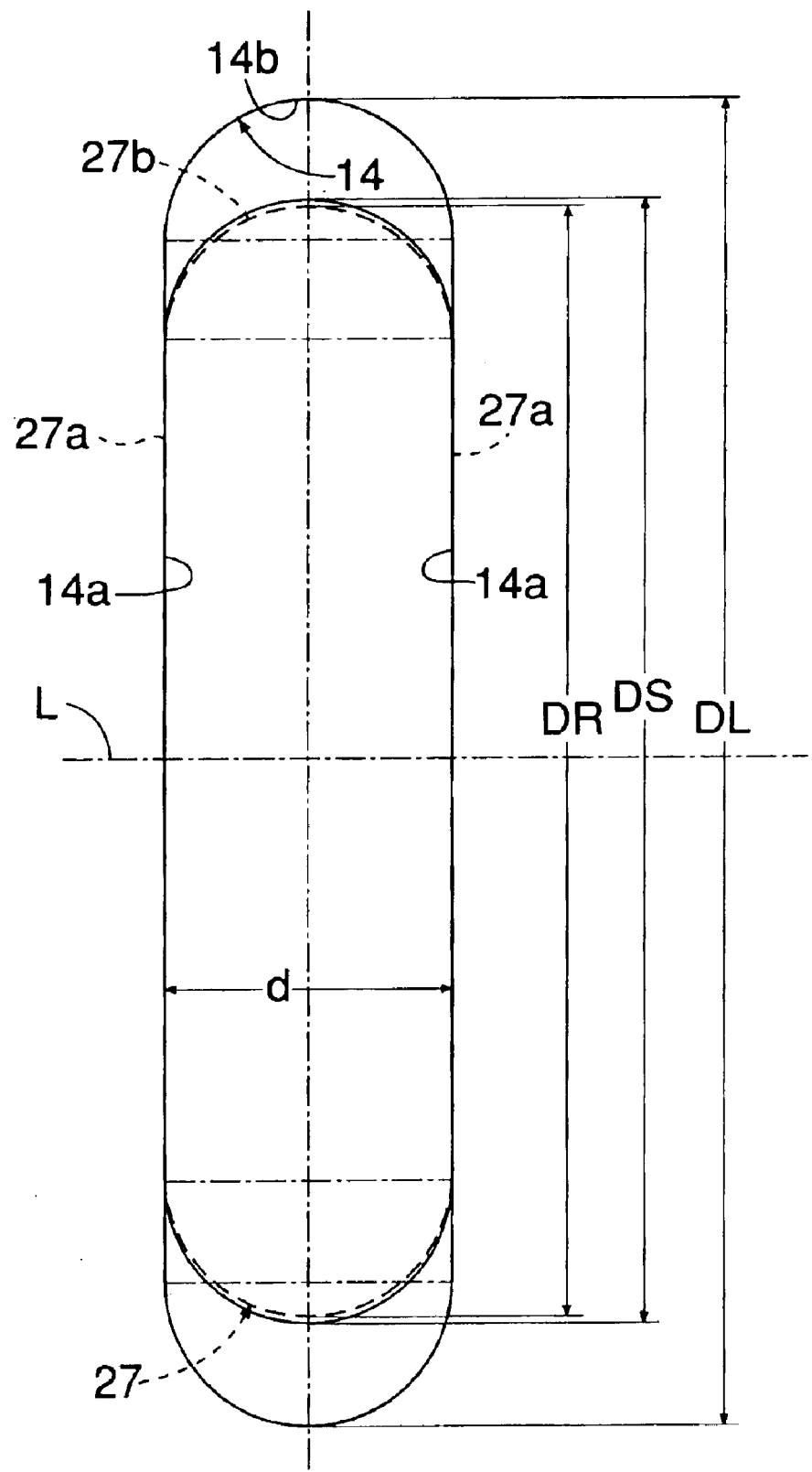

As can be seen from FIGS. 4 and 8, a circular rotor 27 is accommodated in the rotor chamber 14 having a pseudo elliptic shape. The rotor 27 is fitted over and integrally coupled to an outer periphery of the rotary shaft 1 by a pin 28, and an axis of the rotor 27 and an axis of the rotor chamber 14 are brought in line with the axis L of the rotary shaft 21. The rotor chamber 14 has a pseudo elliptic shape as viewed in a direction of the axis L and has a longer diameter DL and a shorter diameter DS. The rotor 27 has a truly circular shape as viewed in the direction of the axis L and has a diameter DR slightly smaller than the shorter diameter DS of the rotor chamber 14.

Each of the rotor chamber 14 and the rotor 27 has a sectional shape similar to a track for a field competition as viewed in a direction perpendicular to the axis L. More specifically, the sectional shape of the rotor chamber 14 is formed from a pair of flat faces 14a, 14a extending in parallel to and at a distance d left between each other, and an arcuate face 14b connecting outer peripheries of the flat faces 14a, 14a smoothly to each other and having a center angle of 180°. Likewise, the sectional view of the rotor 27 is formed from a pair of flat faces 27a, 27a extending in parallel to and at a distance d left between each other, and an arcuate face 27b connecting outer peripheries of the flat faces 27a, 27a smoothly to each other and having a center angle of 180°. Therefore, the flat faces 14a, 14a of the rotor chamber 14 and the flat faces 27a, 27a of the rotor 27 are in contact with each other and thus, a pair of crescent-shaped spaces (see FIG. 4) are defined between an inner peripheral surface of the rotor chamber 14 and an outer peripheral surface of the rotor 27.

The structure of the rotor 27 will be described below in detail with reference to FIGS. 3, 6, 9 and 10.

The rotor 27 is comprised of a rotor core 31 fixed to the outer periphery of the rotary shaft 21, and twelve rotor segments 32 fixed to cover the periphery of the rotor core 31 and forming an outer shell of the rotor 27. The rotor core 31 includes a disk-shaped main body 31a, and gear-shaped boss portions 31b, 31b protruding in axially opposite directions from a center portion of the main body 31a. Twelve cylinders 33 made of a ceramic (or carbon) are mounted radially at distances of 30° in the main body 31a and fixed by caps 34 and keys 35, so that they are prevented from being withdrawn. A smaller-diameter portion 33a is projecting provided at an inner end of each of the cylinders 33 and sealed at its base end from the main body 31a of the rotor core 31 with an O-ring interposed therebetween. A tip end of the smaller-diameter portion 33a is fitted over the outer peripheral surface of the hollow rotary shaft 21, and cylinder bores 33b communicate with the hollow 21a in the rotary shaft 21 through twelve third vapor passages S3 extending through the smaller-diameter portions 33a and the rotary shaft 21. A piston 37 made of a ceramic is slidably received in each of the cylinders 33. When the piston 37 is moved to a radially innermost position, it is retracted and sunk completely in the cylinder bore 33b, and when the piston 37 is moved to radially outermost position, about half of the entire length of the piston 37 protrudes to the outside of the cylinder bore 33b.

Each of the rotor segments 32 is comprised of five components coupled to one another. The five components are a pair of block members 38, 38 having hollows 38a, 38a, a pair of side plates 39, 39 each made of a U-shaped plate material, and a bottom plate 40 made of a rectangular plate material, all of which are integrally coupled to one another by brazing.

Two recesses 38b and 38c are defined in an outer peripheral surface of each of the block members 38, namely, in a surface opposed to each of the flat faces 14a, 14a of the rotor chamber 14 to extend in an arcuate shape about the axis L, and lubricating-water ejection bores 38d and 38e open into central portions of the recesses 38b and 38c. A twenty first water passage W20 and a twenty second water passage W21 are defined in a recessed manner in a surface of the block member 38 coupled to the side plate 39.

An orifice-defined member 41 having twelve orifices is fitted into a central portion of the bottom plate 40, and an O-ring 42 mounted to the bottom plate 40 to surround the orifice-defined member 41 seals the orifice-defined member 41 and the outer peripheral surface of the main body 31a of the rotor core 31 from each other. Fourteenth to nineteenth water passages W14 to W19 are provided two by two in a recessed manner in a surface of the bottom plate 40 coupled to the block member 38 to extend radially from the orifice-defined member 41. The fourteenth to nineteenth water passages W14 to W19 extend toward the surface coupled to the side plate 39.

Twenty second to twenty seventh water passages W22 to W27 are provided in a recessed manner in a surface of each side plate 39 coupled to the block members 38, 38 and the bottom plate 40. The fourteenth water passage W14, the fifteenth water passage W15, the eighteenth water passage W18 and the nineteenth water passage W19 in an outer area of the bottom plate 40 communicate with the twenty second water passage W22, the twenty third water passage 23, the twenty sixth water passage W26 and the twenty seventh water passage W27 in the side plate 39, and the sixteenth water passage W16 and the seventeenth water passage W27 in an inner area of the bottom plate 40 communicate with the twenty fourth water passage W24 and the twenty fifth water passage W25 in the side plate 39 through the twentieth water passage W20 and the twenty first water passage W21 in the block member 38. Outer ends of the twenty second water passage W22, the twnty fifth water passage W25, the twenty sixth water passage W26 and the twenty seventh water passage W27 in the side plate 39 open as four lubricating water ejection bores 39a into the outer surface of the side plate 39. Outer ends of the twenty third water passage W23 and the twenty fourth water passage W24 in the side plate 39 communicate with the lubricating oil ejection bores 38d and 38e in the recesses 38b and 38c through a twenty eighth water passage W28 and a twenty ninth water passage W29 defined in each of the block members 38, 38, respectively. A notch 39b having a partially arcuate section is formed in the outer surface of the side plate 39 in order to avoid the interference with the piston 37 moved radially outwards. The reason why the twentieth water passage W20 and the twenty first water passage W21 are defined in the block member 38 rather than in the side plate 39 is that the side plate 39 has a thickness decreased by provision of the notch 39b, and a thickness enough to define the twentieth water passage W20 and the twenty first water passage W21 can be ensured in the block member 38.

As shown in FIGS. 2, 5, 9 and 11, twelve vane grooves 43 are defined between the adjacent rotor segments 32 of the rotor 27 to extend radially, and plate-shaped vanes 44 are slidably received in the vane grooves 43, respectively. Each of the vanes 44 is formed into a substantially U-shape and includes parallel faces 44a, 44a extending along the parallel faces 14a, 14a of the rotor chamber 14, an arcuate face 44b extending along the arcuate face 14b of the rotor chamber 14, and a notch 44c located between the parallel faces 44a, 44a. Rollers 45, 45 having a roller bearing structure are rotatably supported on a pair of support shafts 44d, 44d protruding from the parallel faces 44a, 44a, respectively.

A seal member 46 made of a synthetic resin and formed into a U-shape is retained on the arcuate face 44b of the vane 44, and has a tip end protruding slightly from the arcuate face 44b of the vane 44 to come into sliding contact with the arcuate face 14b of the rotor chamber 14. Sliding members 47, 47 made of a synthetic resin are fixed to the parallel faces 44a, 44a of the vane 44 to come into sliding contact with the parallel faces 14a, 14a of the rotor chamber 14. Sliding members 48, 48 of a synthetic resin are also fixed to opposite sides of the notch 44c of the vane 44 to come into sliding contact with the main body 31a of the rotor core 31. Two recesses 44e, 44e are defined in each of opposite sides of the vane 44 and opposed to radially inner two of the four lubricating water ejection bores 39a opening into the outer surfaces of the side plates 39, 39 of the rotor segment 32. A projection 44f provided at a central portion of the notch 44c of the vane 44 in a protruding manner to face radially inwards abuts against a radially outer end of the piston 37. A water discharge passage 44g is defined in the vane to extend radially, and opens at its radially inner end into a tip end of the projection 44f and at its radially outer end into one of sides of the vane 44. A location at which the water discharge passage 44g opens into the one side of the vane 44 faces to a point radially outer than the arcuate face 27b of the rotor 27, when the vane 44 is moved to protrude to the radially outermost position.

Annular grooves 49, 49 having a pseudo elliptic shape similar to a rhombic shape with four apexes rounded are provided in a recessed manner in the flat faces 14a, 14a of the rotor chamber 14 defined by the first and second casing halves 12 and 13, and the pair of rollers 45, 45 of each of the vanes 44 are rollably engaged in the annular grooves 49, 49. The distance between each of the annular grooves 49, 49 and the arcuate face 14b of the rotor chamber 14 is constant over the entire periphery. Therefore, when the rotor 44 is rotated, the vane 44 with the rollers 45, 45 guided in the annular grooves 49, 49 is reciprocally moved radially within the vane groove 43 and slid along the arcuate face 14b of the rotor chamber 14 in a state in which the seal member 46 mounted to the arcuate face 44b of the vane 44 has been compressed at a given amount. Thus, it is possible to reliably seal the vane chambers 50 defined between the adjacent vanes 44, while preventing the rotor chamber 14 and the vanes 44 from being brought into direct solid contact with each other to prevent an increase in sliding resistance and the occurrence of the wearing.

A pair of circular seal grooves 51, 51 are defined in the flat faces 14a, 14a of the rotor chamber 14 to surround the outer sides of the annular grooves 49, 49. A pair of ring seals 52 each having two O-rings 52 and 53 are slidably received in the circular seal grooves 51, respectively, and have sealing faces opposed to the recesses 38b and 38c defined in each of the rotor segments 32. The pair of ring seals 54, 54 are prevented from being turned relative to the first and second casing halves 12 and 13 by knock pins 55, 55, respectively.

Figure 9:
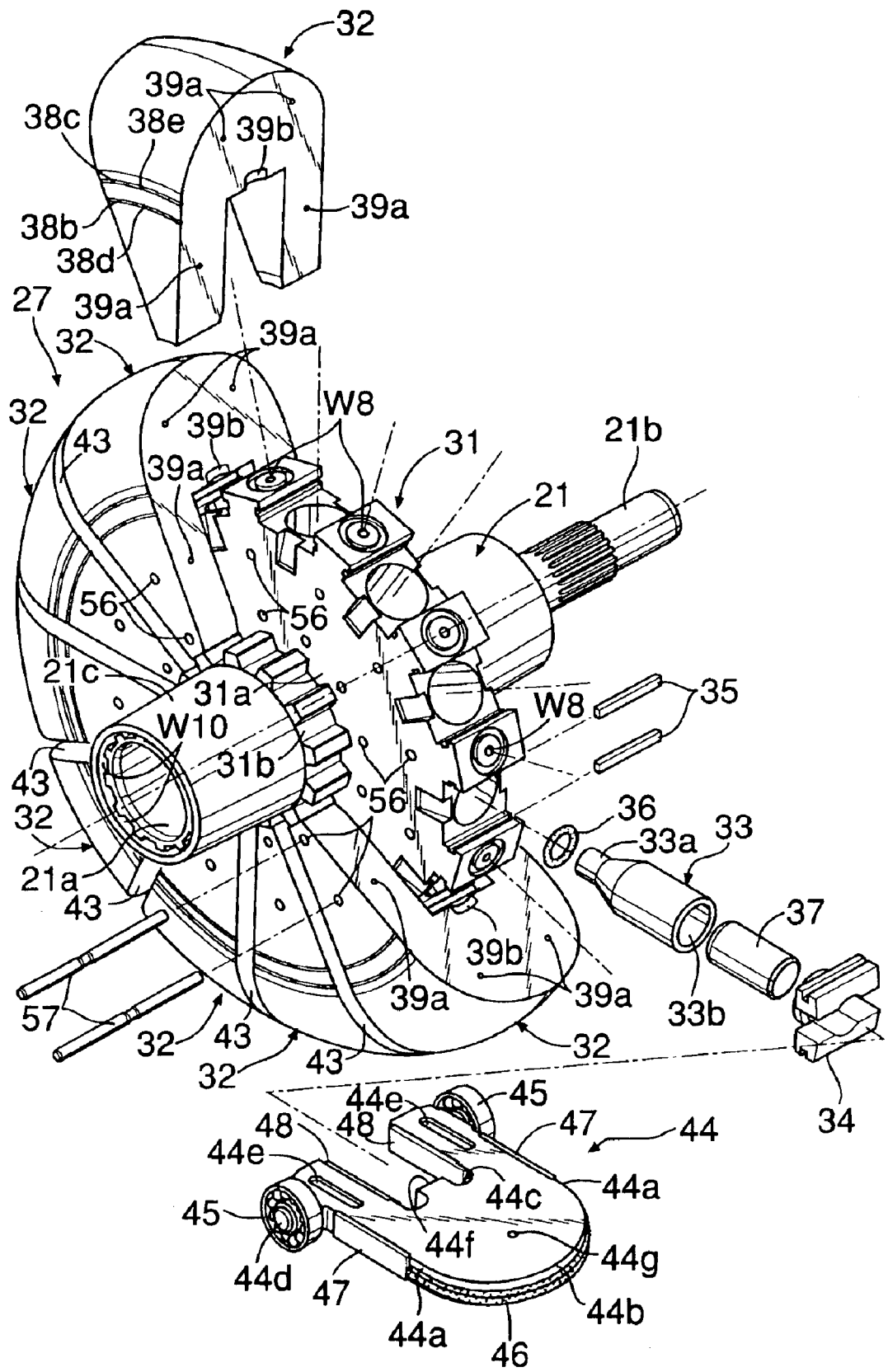
Figure 10:
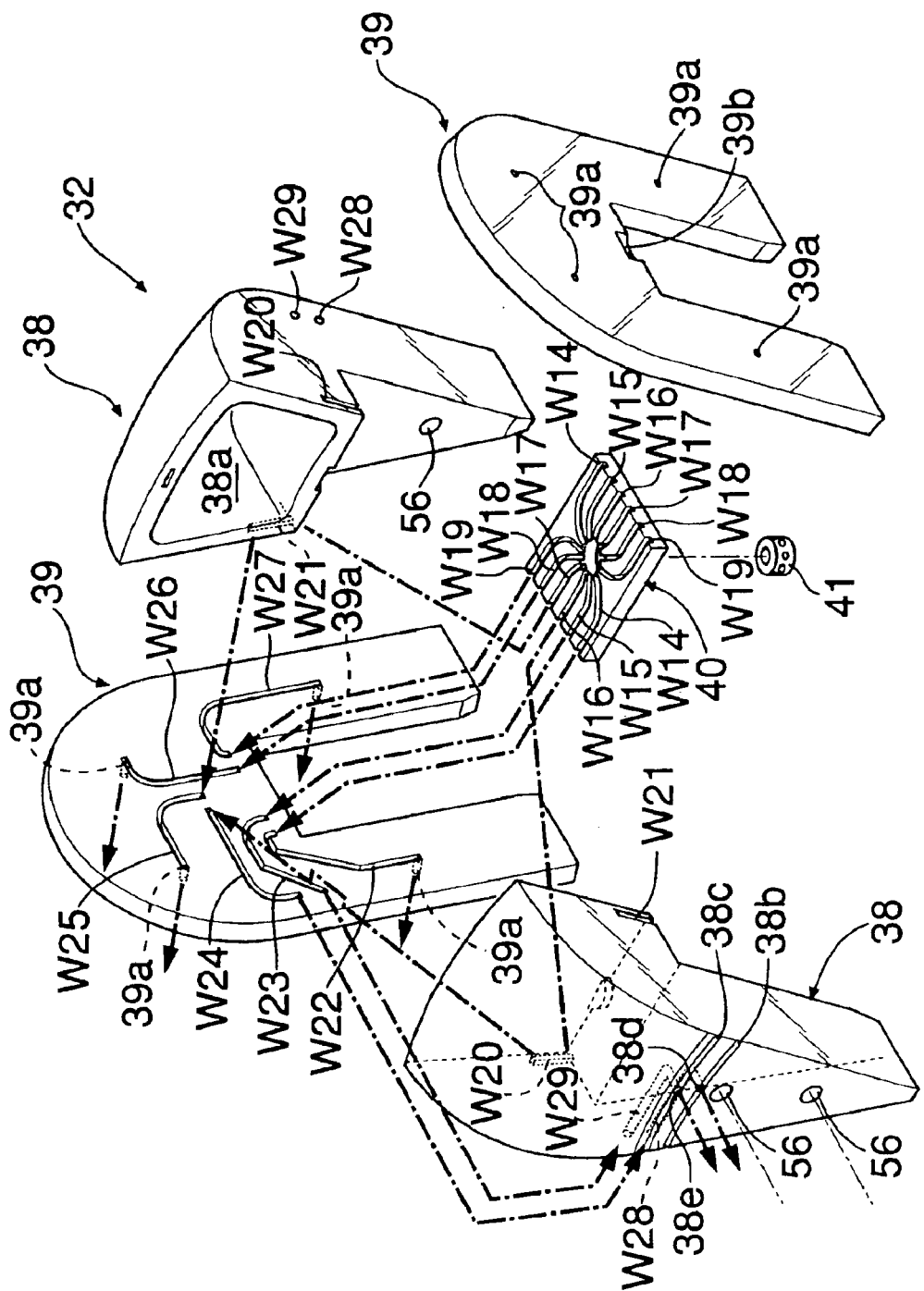
Figure 11:
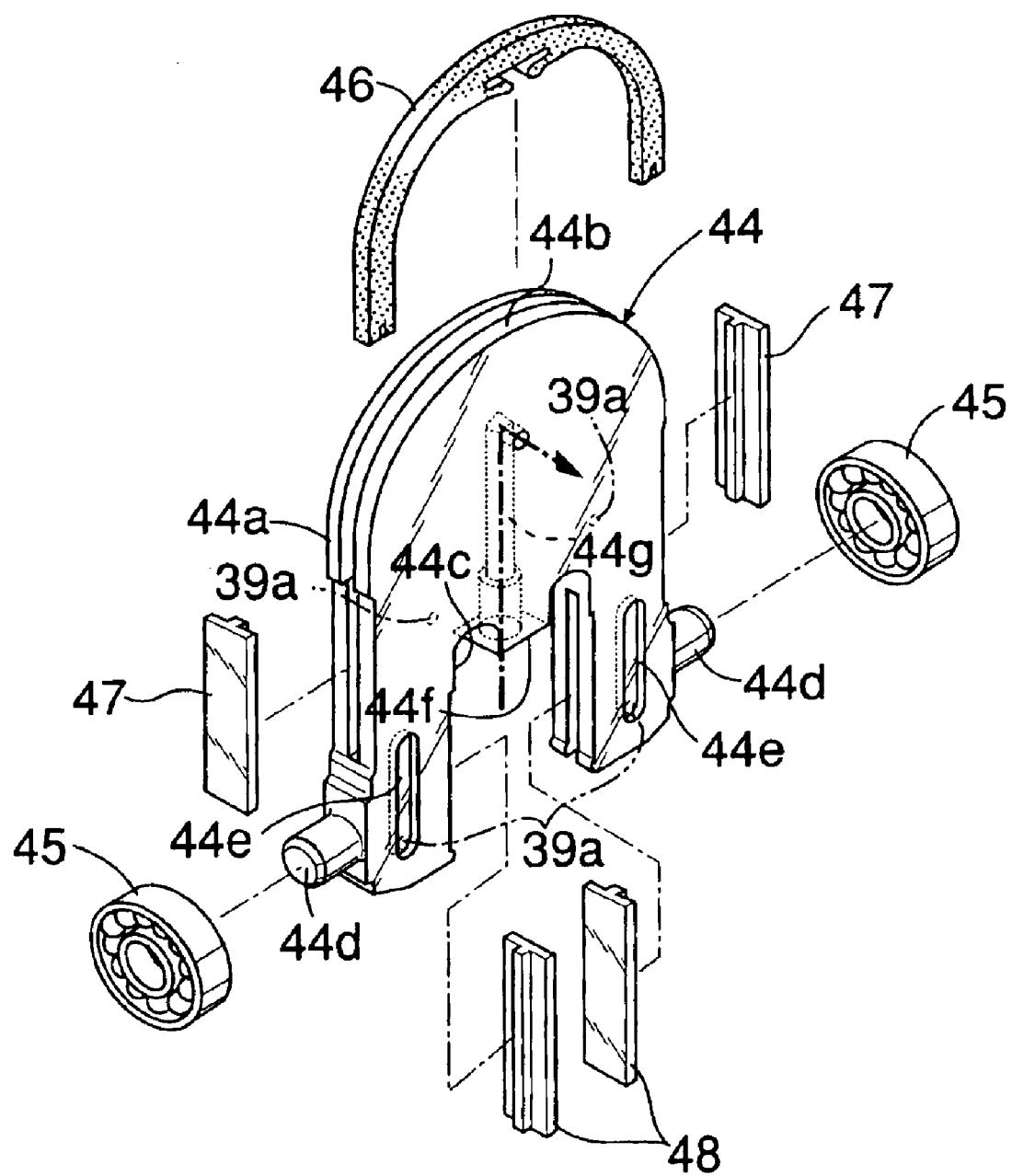

The assembling of the rotor 27 is carried out in the following manner: In FIG. 9, the twelve rotor segments 32 are fitted over the outer periphery of the rotor core 31 having the cylinders 33, the caps 34 and the keys 35 previously assembled thereto, and the vanes 44 are fitted into the twelve vane grooves 43 defined between the adjacent rotor segments 32. At this time, a shim having a predetermined thickness is disposed on each of opposite sides of each vane 44 in order to define a clearance between each of the vanes 44 and each of the side plates 39 of the rotor segments 32. In this state, the rotor segments 32 and the vanes 44 are tightened radially inwards to the rotor core 31 using a jig, and the rotor segments 32 are positioned accurately relative to the rotor core 31. Thereafter, the rotor segments 32 are temporarily fixed to the rotor core 31 by temporarily fixing bolts 58 (see FIG. 2). Then, the rotor 27 is removed from the jig, and the pinholes 56, 56 are made in each of the rotor segments 32 to extend through the rotor core 31. The knock pins 57, 57 are press-fitted into the pinholes 56, 56, whereby rotor segments 32 are coupled to the rotor core 31.

Figure 3:
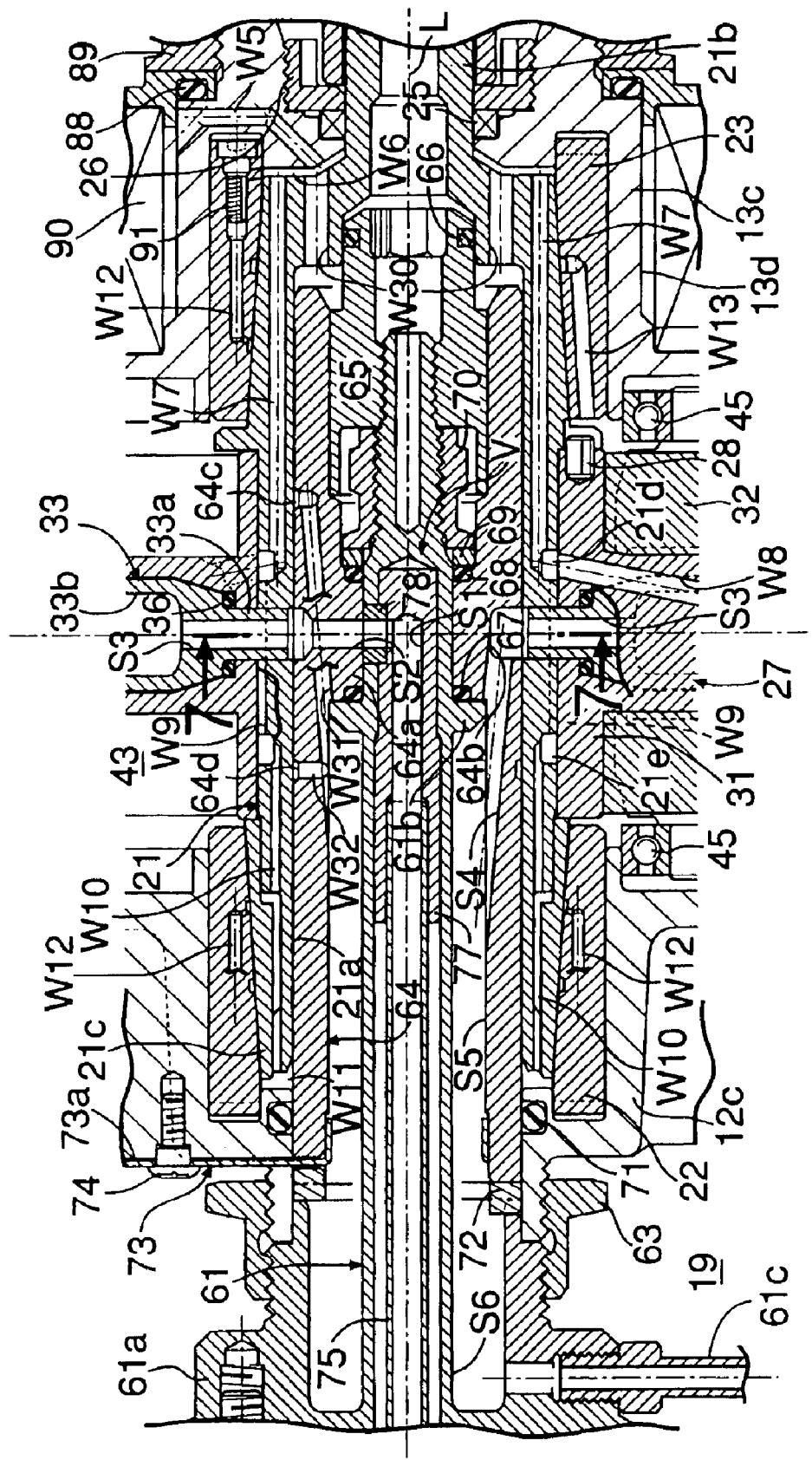
Figure 7:
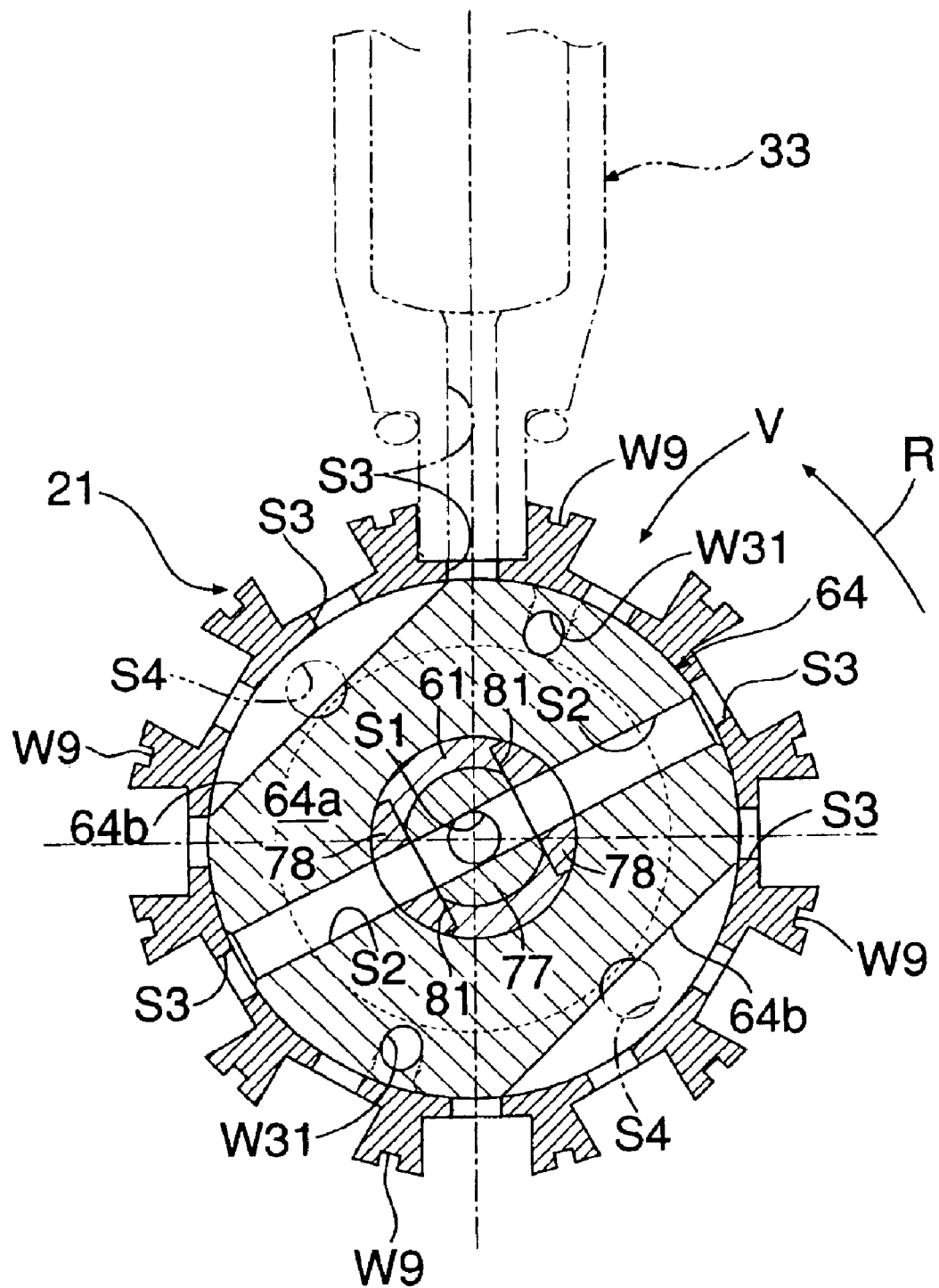
Figure 12:
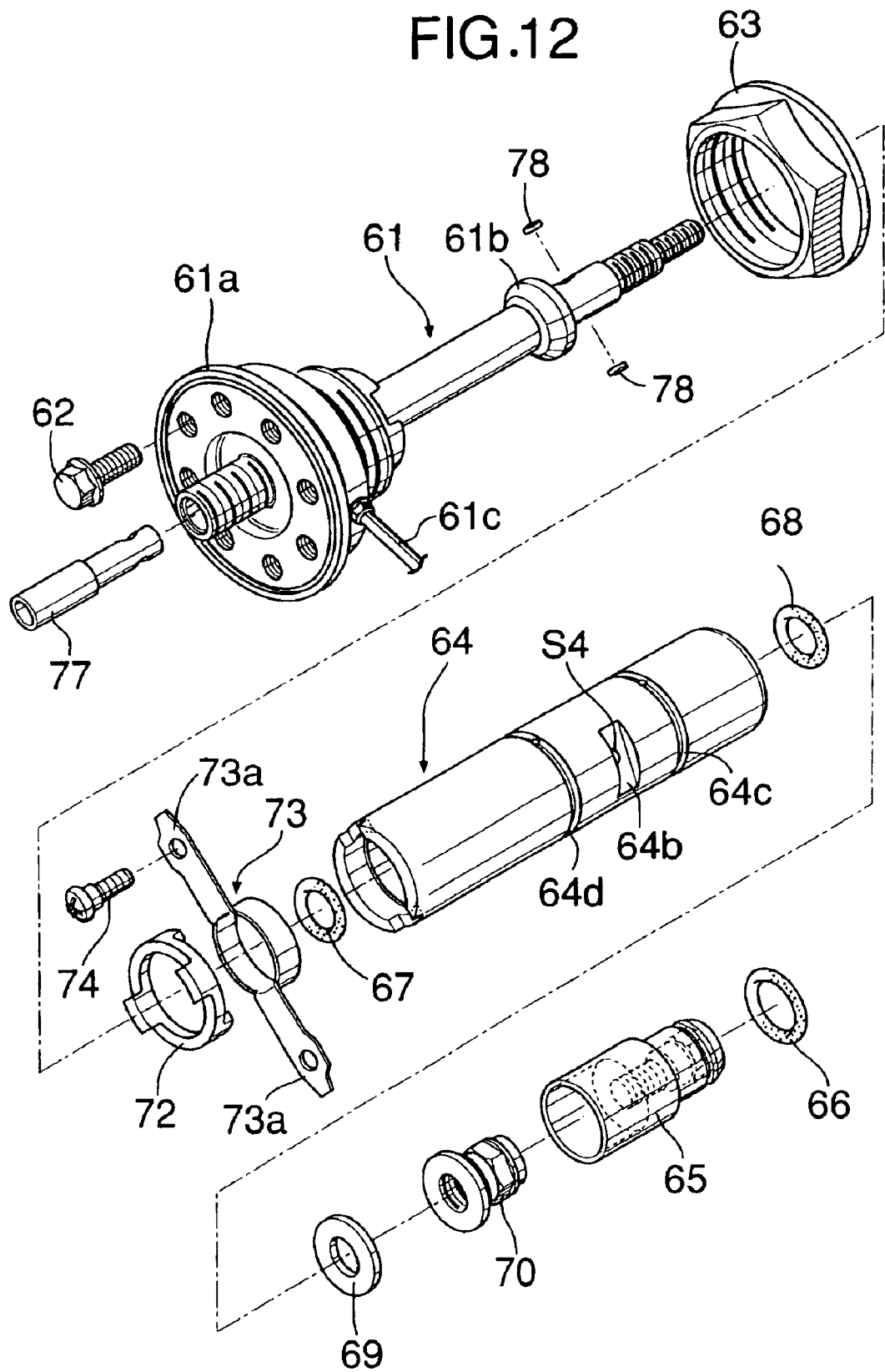

As can be seen from FIGS. 3, 7 and 12, the pair of bearing members 22 and 23 supporting the outer peripheral surface of the rotary shaft 21 has an inner peripheral surface which is tapered, so that its diameter is increased toward the rotor 27. The axially outer ends of the bearing members 22 and 23 are engaged in the hollow bearing tubes 12c and 13c of the first and second casing halves 12 and 13, so that they are prevented from being turned. It should be noted that the outer periphery at the left and of the rotary shaft 21 supported in the left hollow bearing tube 12c is constituted by a different member 21c in order to enable the assembling of the rotor 27 to the rotary shaft 21.

An opening 16b is defined in the center of the relay chamber outer-wall 16, and a boss portion 61a of a valve housing 61 disposed on the axis L is fixed to an inner surface of the opening 16b by a plurality of bolts 62 and also fixed to the first casing half 12 by a nut 63. A cylindrical first fixing shaft 64 is relatively rotatably fitted in the hollow 21a in the rotary shaft 21, and a second fixing shaft 65 is coaxially fitted to an inner periphery of a right end of the first fixing shaft 64. An outer peripheral portion of a right end of the second fixing shaft 65 protruding from the first fixing shaft 64 and the hollow 21a in the rotary shaft 21 are sealed from each other by an O-ring 66. The valve housing 61 extending within the first fixing shaft 64 includes a flange 61b, and an O-ring 67, a thickened portion 64a of the first fixing shaft 64, an O-ring 68, a washer 69, a nut 70 and the second fixing shaft 65 are fitted sequentially at the right of the flange 61b. The nut 70 and the second fixing shaft 65 are threadedly coupled to the valve housing 61 and hence, the thickened portion 64a of the first fixing shaft 64 is positioned between the flange 61b of the valve housing 61 and the washer 69 with the pair of O-rings 66 and 67 interposed therebetween.

The first fixing shaft 64 supported on the inner periphery of the hollow bearing tube 12c of the first casing half 12 with an O-ring 71 interposed therebetween is connected at its left end to the boss portion 61a of the valve housing 61 by a ring-shaped Oldham coupling 72, and the deflection of the rotor 27 supported on the outer periphery of the first fixing shaft 64 through the rotary shaft 21 can be permitted by permitting the radial deflection of the first fixing shaft 64 by the Oldham coupling 72. In addition, the first fixing shaft 64 is prevented from being turned relative to the casing 11 by fixing arms 73a, 73a of a detent member 73 loosely fitted in the left end of the first fixing shaft 64 to the first casing half 12 by bolts 74, 74.

A vapor supply pipe 75 is fitted within the valve housing 61 disposed on the axis L and is fixed to the valve housing 61 by a nut 76. The vapor supply pipe 75 is connected at its right end to a nozzle member 77 press-fitted into the valve housing 61. A pair of recesses 81, 81 (see FIG. 7) are defined at a phase difference of 180° astride the valve housing 61 and a tip end of the nozzle member 77, and annular joint members 78, 78 are fitted into and retained in the recesses 81, 81. A first vapor passage S1 is defined axially in the center of the nozzle member 77 to lead to the vapor supply pipe 75, and a pair of second vapor passages S2, S2 are provided at a phase difference of 180° to extend axially through the thickened portion 64a of the first fixing shaft 64. A terminal end of the first vapor passage S1 and radially inner ends of the second vapor passages S2, S2 are always in communication with each other through the joint members 78, 78. Twelve third vapor passages S3 are provided to extend through the rotary shaft 21 and the smaller-diameter portions 33a of the twelve cylinders 33 retained at the distances of 30° in the rotor 27 fixed to the rotary shaft 21, as described above. Radially inner ends of the third vapor passages S3 are opposed to radially outer ends of the second vapor passage S2, S2 to be able to communicate with them.

A pair of notches 64b, 64b are defined at a phase difference of 180° in the outer peripheral surface of the thickened portion 64a of the first fixing shaft 64, and are capable of communicating with the third vapor passages S3. The notches 64b, 64b communicate with a vapor discharge pipe 61c extending through the intake chamber outer-wall 17 through a pair of fourth vapor passages S4, S4 defined obliquely in the first fixing shaft 64, a fifth vapor passage S5 defined axially in the first fixing shaft 64 and a sixth vapor passage S6 defined in the boss portion 61a of the valve housing 61.

Figure 5:
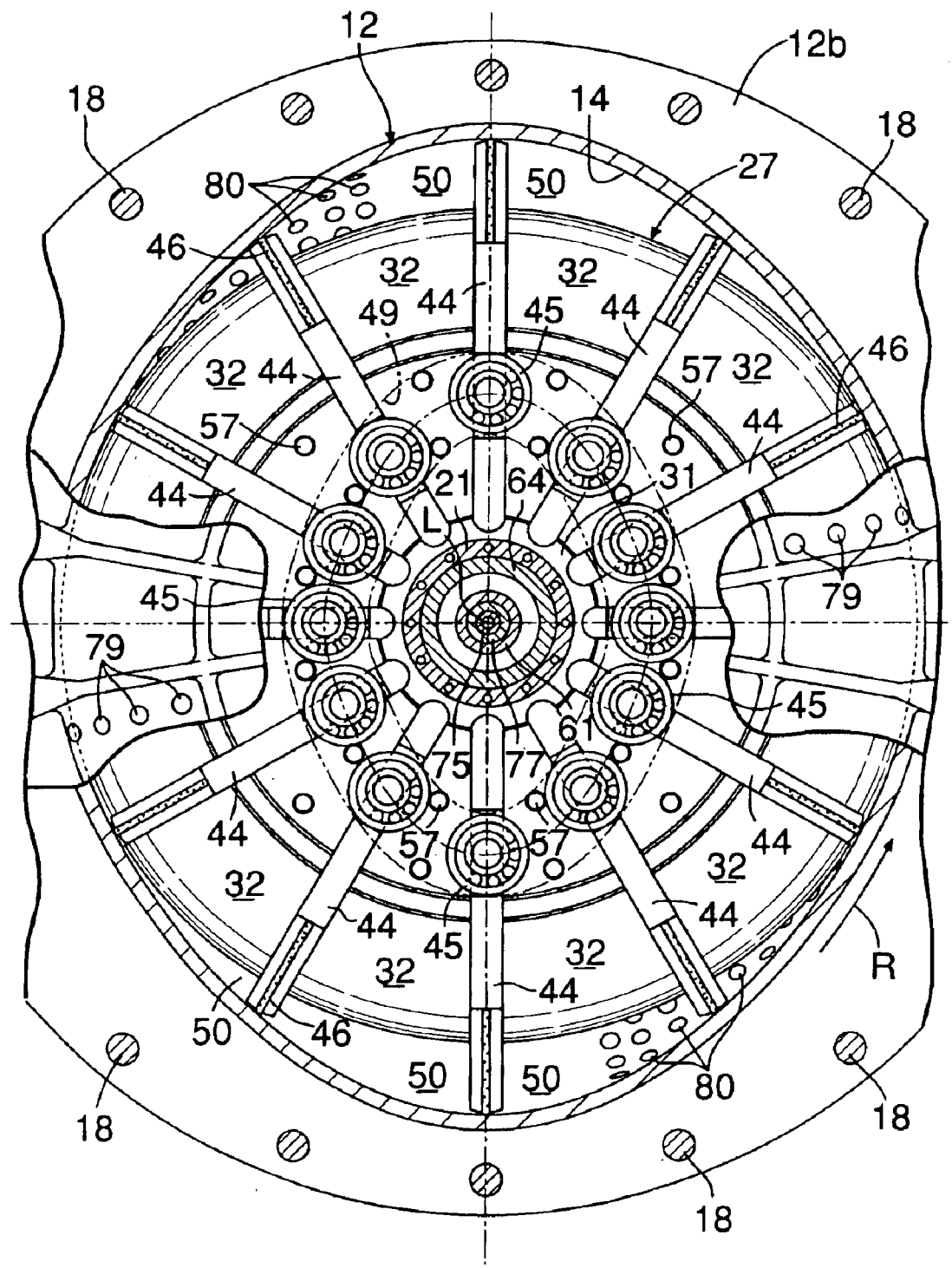

As shown in FIG. 5, a plurality of intake ports 79 are defined in a radial arrangement in the first casing half 12 at locations advanced at an angle of 15° in a direction of rotation of the rotor 27, based on a direction of the shorter-diameter of the rotor chamber 14. The internal space in the rotor chamber 14 communicates with the intake chamber 19 by virtue of the intake ports 79. A large number of exhaust ports 80 are provided and arranged in a plurality of radial arrays in the second casing half 13 at locations delayed at an angle of 15° to 75° in the direction of rotation of the rotor 27, based on the direction of the shorter-diameter of the rotor chamber 14. The internal space in the rotor chamber 14 communicates with the exhaust chamber 20 by virtue of the exhaust ports 80.

A rotary valve V is formed to permit the periodical communication of the second vapor passages S2, S2 and the third vapor passages S3 with each other as well as the periodical communication of the notches 64b, 64b in the first fixing shaft 64 and the third vapor passages S3 with each other by relative rotation of the first fixing shaft 64 and the rotary shaft 21.

Figure 2:
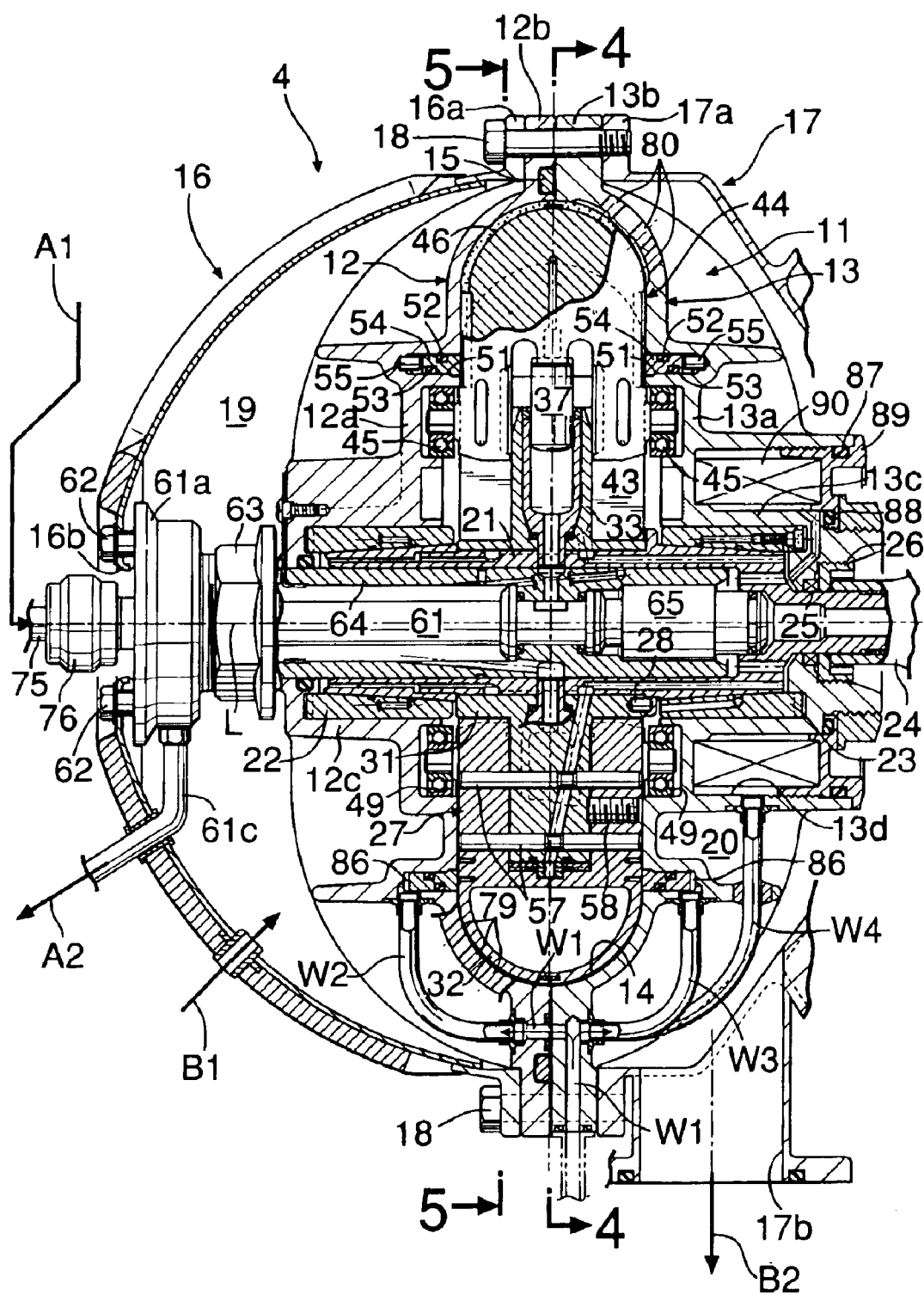

As can be seen from FIGS. 2 and 3, pressure chambers 86, 86 are defined in backs of the ring seals 54, 54 fitted in the circular seal grooves 51, 51 in the first and second casing halves 12 and 13, and a first water passage W1 defined in the first and second casing halves 12 and 13 communicates with both of the pressure chambers 86, 86 through a second water passage W2 and a third water passage W each comprising a pipe. A filter chamber 13d capable of being opened and closed by a cover 89 provided with two O-rings 87 and 88 is defined radially outside the hollow bearing tube 13c of the second casing half 13, and an annular filter 90 is accommodated in the filter chamber 13d. The first water passage W1 in the second casing half 13 communicates with an outer peripheral surface of the filter 90 through a fourth water passage W4 comprising a pipe, and an inner peripheral surface of the filter 90 communicates with a sixth annular water passage W6 defined between the second casing half 13 and the rotary shaft 21 through a fifth water passage W5 defined in the second casing half 13. The sixth water passage W6 communicates with the twelve orifice-defined members 41 through twelve seventh water passages W7 extending axially within the rotary shaft 21, an annular groove 21d defined in the outer periphery of the rotary shaft 21 and twelve eighth water passages W8 extending radially within the rotor core 31, respectively.

The annular groove 21d defined in the outer periphery of the rotary shaft 21 communicates with an annular groove 21e defined in the outer periphery of the rotary shaft 21 through twelve ninth water passages W9 (see FIG. 7) extending axially, and the annular groove 21e communicates with an eleventh annular water passage W11 defined between the left end of the rotary shaft 21 and the first housing half 12 through twelve tenth water passages W10 extending axially within the rotary shaft 21. The sixth annular water passage W6 and the eleventh annular water passage W11 communicate with sliding surfaces between the inner peripheries of the bearing members 22 and 23 and the outer periphery of the rotary shaft 21 through orifices around outer peripheries of orifice-defining bolts 91 threadedly fitted in the bearing members 22 and 23 and further via twelfth water passages W12 defined in the bearing members 22 and 23. The sliding surfaces between the inner peripheries of the bearing members 22 and 23 and the outer periphery of the rotary shaft 21 communicate with the vane grooves 43 via thirteenth draining water passages W13.

The sixth annular water passage W6 communicates with sliding portions between the inner peripheral surface of the hollow 21a in the rotary shaft 21 and the outer peripheral surface of the right end of the first fixing shaft 64 via two thirtieth water passages W30, W30 provided axially in the rotary shaft 21. A seal groove 64c defined at the right of the thickened portion 64a of the first fixing shaft 64 communicates with the fifth vapor passage S5 through thirty first water passages W31, W31 provided obliquely in the first fixing shaft 64. The eleventh annular water passage W11 communicates with sliding portions between the inner peripheral surface of the hollow 21a in the rotary shaft 21 and the outer peripheral surface of the left end of the first fixing shaft 64, and a seal groove 64d defined at the left of the thickened portion 64a of the first fixing shaft 64 communicates with the fifth vapor passage S5 through thirty second water passages S32, W32 extending radially through the first fixing shaft 64 and the thirty first water passages W31, W31.

As can be seen from the comparison of FIGS. 1 and 2 with each other, the high-temperature and high-pressure vapor from the first evaporator 3A is supplied via a passage A1 to the vapor supply pipe 75 for the expander 4, and the dropped-temperature and dropped-pressure vapor is discharged from the vapor discharge pipe 61c of the expander 4 via a passage A2 into the first condenser 5A. The high-temperature and high-pressure vapor from the second evaporator 3B is supplied via a passage B1 into the intake chamber 19 in the expander 4, and the dropped-temperature and dropped-pressure vapor is discharged from the discharge bore 17B of the exhaust chamber 20 via a passage B2 into the second condenser 5B.

The operation of the present embodiment having the above-described arrangement will be described below.

Figure 6:
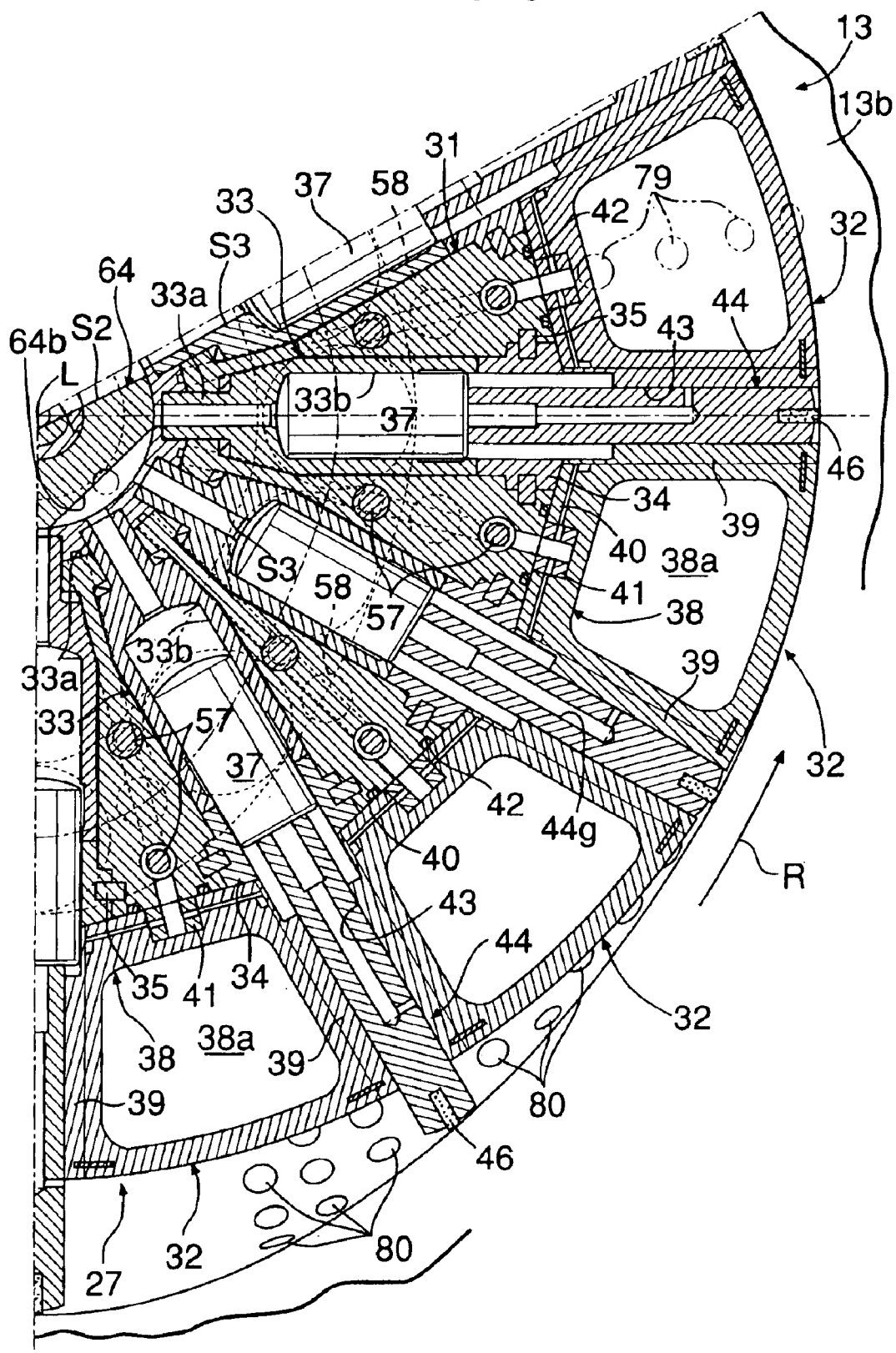

First, the operation of the expander 4 will be described. Referring to FIG. 3, the high-temperature and high-pressure vapor from the passage A1 leading to a downstream side of the first evaporator 3A is supplied to the vapor supply pipe 75, the first vapor passage S1 defined axially in the nozzle member 77 and the pair of second vapor passages S2, S2 extending radially through the nozzle member 77, the joint members 78, 78 and the thickened portion 64a of the first fixing shaft 64. Referring to FIGS. 6 and 7, when the rotary shaft 21 rotated in unison with the rotor 27 reaches a predetermined phase, the pair of third vapor passages S3, S3 existing at the locations advanced in the direction of rotation of the rotor 27 shown by an arrow R from a shorter diameter position of the rotor chamber 14 are put into communication with the pair of second vapor passages S2, S2, whereby the high-temperature and high-pressure vapor in the second vapor passages S2, S2 is supplied into the pair of cylinders 33, 33 via the third vapor passages S3, S3 to urge the pistons 37, 37 radially outwards. When the vanes 44, 44 urged by the pistons 37, 37 are moved radially outwards, the advancing movements of the pistons 37, 37 are converted into the rotational movement of the rotor 27 by the engagement of the pair of rollers 45, 45 mounted on the vanes 44, 44 and the annular grooves 49, 49 with each other.

Even after the communication between the second vapor passages S2, S2 and the third vapor passages S3, S3 is blocked with the rotation of the rotor 27 in the direction indicated by the arrow R, the pistons 37, 37 are further advanced by the further continuation of the expansion of the high-temperature and high-pressure vapor within the cylinders 33, 33, whereby the rotation of the rotor 27 is continued. When the vanes 44, 44 reach a longer-diameter position of the rotor chamber 14, the third vapor passages S3, S3 leading to the corresponding cylinders 33, 33 are put into communication with the notches 64b, 64b of the first fixing shaft 64, and the pistons 37, 37 urged by the vanes 44, 44 with the rollers 45, 45 guided in the annular grooves 49, 49 are moved radially inwards, whereby the vapor in the cylinders 33, 33 is supplied as a dropped-temperature and dropper-pressure vapor into the passage A2 through the third vapor passages S3, S3, the notches 64b, 64b, the fourth vapor passages S4, S4, the fifth vapor passage S5, the sixth vapor passage S6 and the vapor discharge pipes 61c.

The high-temperature and high-pressure vapor from the passage B1 leading to a downstream side of the second evaporator 3B is supplied via the intake chamber 19 and the intake ports 79 in the first casing half 12 into the vane chamber 50 in the rotor chamber 14, namely, the space defined by the rotor chamber 14, the rotor 27 and the pair of adjacent vanes 44, 44, where the vapor is expanded to rotate the rotor 27. The dropped-temperature and dropped-pressure vapor which has finished its work is discharged from the exhaust ports 80 in the second casing half 13 into the exhaust chamber 20 and supplied therefrom via the discharge bore 17 and the passage B2 into the second condenser 5B.

In this manner, the twelve pistons 37 are operated sequentially by the expansion of the high-temperature and high-pressure vapor from the first evaporator 3A to rotate the rotor 27 through the rollers 45, 45 and the annular grooves 49, 49, and an output is produced from the rotary shaft 21 by rotating the rotor 27 through the vanes 44 by the high-temperature and high-pressure vapor from the second evaporator 3B.

The lubrication of various sliding portions of the expansion 4 by the water will be described below.

The supplying of the lubricating water is carried out utilizing the first supply pump 6A (see FIG. 1) for supplying the water from the first condenser 5A under a pressure to the first evaporator 3A, and a portion of the water discharged by the first supply pump 6A is supplied as a lubricating water to the first water passage W1 in the casing 11. By utilizing the first supply pump 6A to supply the water to static pressure bearings at various portions of the expander 4, a special pump is not required, leading to a reduction in number of parts.

The water supplied to the first water passage W1 is supplied via the second water passage W2 and the third water passage W3 each comprising the pipe into the pressure chambers 86, 86 in the bottoms of the circular seal grooves 51, 51 in the first casing half 12 and the second casing half 13 to bias the ring seals 54, 54 toward the side of the rotor 27. The water supplied from the first water passage W1 to the fourth water passage W4 comprising the pipe, after being filtered by the filter 90 to remove a foreign matter, is supplied to the fifth water passage W5 defined in the second casing half 13, the sixth water passage W6 defined between the second casing half 13 and the rotary shaft 21, the seventh water passages W7 defined within the rotary shaft 21, the annular groove 21d in the rotary shaft 21 and the eighth water passages W8 defined in the rotor core 31, where the water is further pressurized by the centrifugal force produced with the rotation of the rotor 27 and then supplied to the orifice-defined members 41 of the rotor segments 32.

In each of the rotor segments 32, the water flowing through the orifice-defined member 41 into the fourteenth water passage 14 in the bottom plate 40 is passed through the twenty second water passage W22 in the side plate 39 and ejected from the lubricating water ejection bores 39a, and the water flowing through the orifice-defined member 41 into the seventeenth water passage W17 in the bottom plate 40 is passed through the twenty first water passage W21 in the block member 38 and the twenty fifth water passage W25 in the side plate 39 and ejected from the lubricating water ejection bores 39a. The water flowing through the orifice-defined member 41 into the eighteenth water passage W18 in the bottom plate 40 is passed through the twenty sixth water passage W26 in the side plate 39 and ejected from the lubricating water ejection bores 39a, and the water flowing through the orifice-defined member 41 into the nineteenth water passage W19 in the bottom plate 40 is passed through the twenty seventh water passage W27 in-the side plate 39 and ejected from the lubricating water ejection bores 39a. Lower two of the four lubricating water ejection bores 39a opening into the surface of the side plate 39 communicate with the insides of the recesses 44e, 44e in the two vanes 44.

The water flowing through the orifice-defined member 41 into the fifteenth water passage W15 in the bottom plate 40 is passed through the twenty third water passage W23 in the side plate 39 and the twenty ninth water passage W29 in the block member 38 and ejected from the lubricating water ejection bore 38e within the recess 38c, and the water flowing through the orifice-defined member 41 into the sixteenth water passage W16 in the bottom plate 40 is passed through the twentieth water passage W20 in the block member 38, the twenty fourth water passage W24 in the side plate 39 and the twenty eighth water passage W28 in the block member 38 and ejected from the lubricating water ejection bore 38d within the recess 38b.

The water ejected from the lubricating water ejection bores 39a in the side plate 39 of each of the rotor segments 32 into the vane groove 43 forms a static pressure bearing between the vane groove 43 and the vane 44 slidably fitted in the vane groove 43 to support the vane 44 in a floated state, thereby preventing the solid contact of the side plate 39 of the rotor segment 32 and the vane 44 with each other to prevent the occurrences of the seizure and the wearing. By supplying the water for lubricating the sliding surface of the vane 33 through the eighth water passage W8 provided radially in the rotor 27 in the above manner, the water can be pressurized by the centrifugal force, but also the temperature around the rotor 27 can be stabilized to reduce the influence due to the thermal expansion, and the set clearance can be maintained to suppress the leakage of the vapor to the minimum.

A circumferential load applied to each of the vanes 44 (a load in a direction perpendicular to the plate-shaped vane 44) is a resultant force derived from a load due to a difference between vapor pressures applied to the front and rear surfaces of the vane within the rotor chamber 14 and circumferential components of reaction forces received from the annular grooves 49, 49 by the rollers 45, 45 mounted on the vane 44, but these loads are varied periodically depending on the phase of the rotor 27. Therefore, the vane 44 receiving such unbalanced load periodically shows such a behavior that it is inclined within the vane groove 43.

If the vane 44 is inclined by the unbalanced load in this manner, the clearance between the vane 44 and the four lubricating water discharge bores 39a opening into the side plates 39, 39 of the rotor segments 32 on opposite sides of the vane 44 is varied and hence, the water film in the widened portion of the clearance is carried away, and it is difficult for the water to be supplied into the narrowed portion of the clearance. For this reason, there is a possibility that the pressure is not built up at the sliding portions, whereby the vane 44 is brought into direct contact with the sliding surfaces of the side plates 39, 39 to become worn. According to the present embodiment, however, the water is supplied through the orifices into the lubricating water discharge bores 39a by the orifice-defined member 41 mounted on the rotor segment 32 and hence, the above-described disadvantage is overcome.

More specifically, when the clearance between the lubricating water discharge bores 39a and the vane 44 is widened, the pressure of water supplied is constant and hence, the flow rate of the water is increased by an increase in amount of water flowing out of the clearance relative to a constant pressure difference produced across the orifice in a steady state, whereby the pressure difference across the orifice is increased by virtue of an orifice effect, leading to a reduction in the pressure in the clearance, and as a result, a force for narrowing the widened clearance back to the original width is generated. When the clearance between the lubricating water discharge bores 39a and the vane 44 is narrowed, the amount of water flowing out of the clearance is reduced, leading to a reduction in pressure difference across the orifice, and as a result, a force for widening the clearance narrowed due to the in crease in pressure in the clearance back to the original width is generated.

Even if the clearance between the lubricating water discharge bores 39a and the vane 44 is varied by the load applied to the vane 44, as described above, the orifices automatically regulate the pressure of the water supplied to the clearance depending on the variation in size of the clearance and hence, the clearance between the vane 44 and each of the side plates 39, 39 of the rotor segments 32 on the opposite sides of the vane 44 can be maintained at a desired size. Thus, the water film can be always retained between the vane 44 and each of the side plates 39, 39 to support the vane in the floated state, thereby reliably avoiding that the vane 44 is brought into solid contact with the sliding surface of each of the side plates 39, 39 to become worn.

In addition, the water is retained in each of the two recesses 44e, 44e defined in each of the opposite surfaces of the vane 44 and hence, each of the recesses 44e, 44e serves as a pressure dam to suppress a drop in pressure due to the leakage of the water. As a result, the vane 44 clamped between the sliding surfaces of the pair of side plates 39, 39 is brought into the floated state by means of the water, whereby the sliding resistance can be decreased to near zero. When the vane 44 is moved reciprocally, the radial position of the vane 44 relative to the rotor 27 is changed, but the vane 44 moved reciprocally can be always retained in the floated state to effectively reduce the sliding resistance, because the recesses 44e, 44e are provided in the vane 44 rather than in the side plates 39, 39 and provided in the vicinity of the rollers 45, 45 with the load applied most largely to the vane 44.

The water which has lubricated the sliding surfaces of the vane on the side plates 39, 39 is moved radially outwards by the centrifugal force to lubricate the sliding portions of the seal member 46 mounted on the arcuate face 44b of the vane 44 and the arcuate face 14b of the rotor chamber 14. The water which has finished the lubrication is discharged from the rotor chamber 14 through the exhaust ports 80.

As described above, the water is supplied to the pressure chambers 86, 86 in the bottoms of the circular seal grooves 51, 51 in the first casing half 12 and the second casing half 13 to bias the ring seals 54, 54 toward the side of the rotor 27, and the water is ejected from the lubricating water ejection bores 38d and 38e defined within the recesses 38b and 38c in each of the rotor segments 32 to form the static pressure bearing on the sliding surface on the flat faces 14a, 14a of the rotor chamber 14, whereby the flat faces 27a, 27a of the rotor 27 can be sealed by the ring seals 54, 54 which are in the floated state within the circular seal grooves 51, 51. As a result, the vapor in the rotor chamber 14 can be prevented from being leaked through the clearance between the rotor chamber 14 and the rotor 27. At this time, the ring seals 54, 54 and the rotor 27 are isolated from each other by the water films supplied from the lubricating water ejection bores 38d and 38e, so that they cannot be brought into solid contact with each other. In addition, even if the rotor 27 is inclined, the ring seals 54, 54 within the circular seal grooves 51, 51 are inclined, following the inclination of the rotor 27, whereby the stable sealing performance can be ensured, while suppressing the frictional force to the minimum.

The water which has lubricated the sliding portions of the ring seals 54, 54 and the rotor 27 is supplied to the rotor chamber 14 by the centrifugal force and discharged therefrom via the exhaust ports 80 to the outside of the casing 11.

On the other hand, the water supplied from the sixth water passage W6 flows via the orifices defined around the outer peripheries of the orifice-defining bolts 91 in the bearing member 23 and the twelfth water passages 12 to form the water film on sliding surfaces of the inner periphery of the bearing member 23 and the outer periphery of the rotary shaft 21 to support the outer periphery of a right half of the rotary shaft 21 in the floated state by the water film, thereby lubricating the sliding surfaces in such a manner that the solid contact of the rotary shaft 21 and the bearing member 23 with each other is prevented to prevent the occurrences of the seizure and the wearing. The water supplied from the sixth water passage W6 to the seventh water passages W7, the ninth water passages W9, the tenth water passages W10 and the eleventh water passage W11 defined in the rotary shaft 21 flows via the orifices defined around the outer peripheries of the orifice-defining bolts 91 in the bearing member 22 and the twelfth water passages W12 to form the water film on sliding surfaces of the inner periphery of the bearing member 22 and the outer periphery of the rotary shaft 21 to support the outer periphery of a left half of the rotary shaft 21 in the floated state by the water film, thereby lubricating the sliding surfaces in such a manner that the solid contact of the rotary shaft 21 and the bearing member 23 with each other is prevented to prevent the occurrences of the seizure and the wearing. The water which has lubricated the sliding surfaces of the bearing members 22 and 23 is discharged via the thirteenth water passages W13 defined within the bearing members 22 and 23 into the vane grooves 43.

The water accumulated in the vane grooves 43 flows into the water discharge passages 44g connecting the bottoms of the vanes 44 with one-sides of the vanes 44, but because the water discharge passages 44g open into the rotor chamber 14 in a predetermined angle range where the vanes 44 protrude most largely from the rotor 27, the water in the vane grooves 43 is discharged via the water discharge passages 44g into the rotor chamber 14 under the action of a difference in pressure between the vane grooves 43 and the rotor chamber 14.

The water supplied from the sixth water passage W6 via the thirtieth water passage W30 defined in the rotary shaft 21 lubricates the outer periphery of the first fixing shaft 64 and the right half of the sliding surface on the inner periphery of the rotary shaft 21, and is then discharged from the seal groove 64c in the first fixing shaft 64 via the thirty first water passages W31, W31 to the fifth vapor passage S5. Further, the water from the eleventh water passage W11 lubricates the outer periphery of the first fixing shaft 64 and the left half of the sliding surface on the inner periphery of the rotary shaft 21, and is then discharged from the seal groove 64d in the first fixing shaft 64 via the thirty first water passage W31 to the fifth vapor passage S5.

As described above, the rotor 27 of the expander 4 is constituted in a divided manner by the rotor core 31 and the plurality of rotor segments 32 and hence, the dimensional accuracy of the vane grooves 43 in the rotor 27 can be enhanced easily. In the simple rotor 27, it is extremely difficult to make the vane grooves 43 with a groove width having a good accuracy to enhance the surface roughness of the sliding surface, but such problem can be solved by assembling the plurality of previously fabricated rotor segments to the rotor core 31. Moreover, even if an error is accumulated due to the assembling of the plurality of rotor segments 32, the accumulation of error can be absorbed by regulating the size of last one of the rotor segments 32, thereby fabricating the rotor 27 having a high accuracy as a whole.

The inner rotor core 31 to which the high-temperature and high-pressure vapor is supplied and each of the outer rotor segments 32 relatively low in temperature are formed by the different members. Therefore, the transmission of heat from the rotor core 31 having the high temperature to the rotor segments 32 can be suppressed, whereby the dissipation of heat to the outside of the rotor 27 can be prevented to enhance the thermal efficiency, but also the thermal deformation of the rotor 27 can be moderated to enhance the accuracy. Moreover, a material and a processing method suitable for each of the functions of the rotor core 31 and the rotor segments 32 can be selected and hence, the degree of freedom of the design and the degree of freedom of the processing method are increased, and the alleviation of the wearing of the sliding surfaces of the rotor segments 32 and the vanes 44, an enhancement in durability and an enhancement in sealability can be achieved. Further, even when a disadvantage is arisen in a portion of the rotor 27, the rotor 27 can be repaired only by replacing such portion by a new portion. This can contribute to a reduction in cost, as compared with a case where the entire rotor is replaced by a new rotor, or is discarded.

When the warming operation of the internal combustion engine 1 is still uncompleted, or during the low-load operation of the internal combustion engine 1, the catalyst in the exhaust emission control device 8 is brought into an inactive state without sufficient rise in its temperature and hence, it is necessary to heat the catalyst quickly by heat of an exhaust gas to activate it. In this state, the temperature of the catalyst detected by the temperature sensor 9 mounted on the exhaust emission control device 8 is equal to or lower than a preset temperature. For this reason, the first supply pump 6A in the first Rankine cycle 2A is stopped or reduced in capacity by a command from the electronic control unit 10 and thus, the water is not circulated through the inside of the first evaporator 3A, or the amount of water circulated through the inside of the first evaporator 3A is reduced. As a result, the heat of the exhaust gas from the internal combustion engine 1 can be supplied to the exhaust emission control device 8 without being little robbed of its heat during passing through the first evaporator 3A, thereby heating the catalyst quickly to activate it. Moreover, the pentene or the substitute flon which is the working medium flowing in the second evaporator 3B in the second Rankine cycle 2B mounted at the location downstream of the exhaust emission control device 8 has a low boiling point and hence, can be converted into a vapor easily by the low-temperature exhaust gas immediately after the start of, or during the low-load operation of the internal combustion engine 1 to operate the expander 4 without hindrance.

After completion of the warming operation of the internal combustion engine 1, or during the high-load operation of the internal combustion engine 1, the catalyst in the exhaust emission control device 8 is sufficiently raise in temperature and activated, and the temperature of the catalyst detected by the temperature sensor 9 exceeds the preset temperature and hence, the first supply pump 6A in the first Rankine cycle 2A is driven by the command from the electronic control unit 10. Thus, the water is supplied to the first evaporator 3A in the first Rankine cycle 2A mounted at the location upstream of the exhaust emission control device 8, and the resulting vapor is supplied to the cylinders 33 which are the high-temperature expanding portions of the expander 4 to drive the rotary shaft 21. At the same time, the pentene or the substitute flon is supplied to the second evaporator 3B in the second Rankine cycle 2B mounted at the location downstream of the exhaust emission control device 8, and the resulting vapor is supplied to the vane chambers 50 which are the low-pressure expanding portions of the expander 4, thereby driving the rotary shaft 21. The working medium flowing through the first evaporator 3A on an upstream side where the temperature of the exhaust gas is higher at that time, has the higher boiling point, and the second working medium flowing through the second evaporator 3B on a downstream side where the temperature of the exhaust gas is lower at that time, has the lower boiling point, and hence, the heat energy of the exhaust gas can be recovered further effectively. The shaft torque generated in each of the cylinders 33 and the shaft torque generated each of the vane chamber 50 are united together in the expander 4 and output to the common rotary shaft 21 and hence, a special power-uniting means is not required, leading to a simplified structure.

Although the embodiment of the present invention has been described in detail, it will be understood that various modifications in design may be made without departing from the subject matter of the present invention.

Industrial Applicability

As discussed above, the Rankine cycle system for the internal combustion engine according to the present invention can be suitably utilized as a power source for traveling of a vehicle, but may be utilized to any other application.

What is claimed is:

1. A Rankine cycle system for an internal combustion engine, comprising a first Rankine cycle (2A) operated by a first working medium and a second Rankine cycle (2B) operated by a second working medium, each of the Rankine cycles (2A and 2B) being comprised of an evaporator (3A, 3B) for heating a liquid-phase working medium by waste heat from the internal combustion engine (1) to generate a vapor, an expander (4) for converting the heat energy of the vapor discharged by said evaporator (3A, 3B) into a mechanical energy, a condenser (5A, 5B) for cooling the vapor discharged by said expander (4) to return the vapor into the liquid-phase working medium, and a supply pump (6A, 6B) for supplying the water discharged by said condenser (5A, 5B) to said evaporator (3A, 3B), wherein said evaporator (3A) in said first Rankine cycle (2A) and said evaporator (3B) in said second Rankine cycle (2B) are respectively disposed at locations upstream and downstream of an exhaust emission control device (8) mounted in an exhaust passage (7) for the internal combustion engine (1); said first working medium is of a boiling point higher than that of said second working medium; and the capacity of said supply pump (6A) in at least said first Rankine cycle (2A) is variable.

2. A Rankine cycle system for an internal combustion engine according to claim 1, wherein said expander (4) includes higher-pressure expanding portions (33) and lower-pressure expanding portions (50), so that outputs from both of said expanding portions (33 and 50) can be united together and output from a common rotary shaft (21); the vapor of said first working medium is supplied to said higher-pressure expanding portions (33); and the vapor of said second working medium is supplied to said lower-pressure expanding portions (50).

* * * * *

UNITED STATES PATENT AND TRADEMARK OFFICE
CERTIFICATE OF CORRECTION

PATENT NO. : 6,910,333 B2
DATED : June 28, 2005
INVENTOR(S) : Masahiko Minemi et al.

It is certified that error appears in the above-identified patent and that said Letters Patent is hereby corrected as shown below:

Column 18,
Line 2, replace "the water" with -- the liquid phase working medium --.

Signed and Sealed this

Twenty-ninth Day of November, 2005

JON W. DUDAS
*Director of the United States Patent and Trademark Office*